United States Patent
Kang (10) Patent No.: US 11,562,652 B2
(45) Date of Patent: Jan. 24, 2023

(54) VEHICLE REARWARD WARNING SYSTEM AND ITS METHOD

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 23 days.

(21) Appl. No.: 17/220,614

(22) Filed: Apr. 1, 2021

(65) Prior Publication Data
US 2021/0319700 A1   Oct. 14, 2021

(30) Foreign Application Priority Data
Apr. 10, 2020   (KR) .................. 10-2020-0044327

(51) Int. Cl.
   *G08G 1/16*   (2006.01)
   *B60Q 9/00*   (2006.01)
   *G01S 13/931* (2020.01)

(52) U.S. Cl.
   CPC ............. *G08G 1/166* (2013.01); *B60Q 9/008* (2013.01); *G01S 13/931* (2013.01); *G01S 2013/93272* (2020.01)

(58) Field of Classification Search
   CPC .............. G08G 1/166; B60Q 9/008; G01S 2013/93272; G01S 13/931
   See application file for complete search history.

(56) References Cited

U.S. PATENT DOCUMENTS

| | | |
|---|---|---|
| 2002/0147534 A1 | 10/2002 | Delcheccolo et al. |
| 2014/0044311 A1 | 2/2014 | Takahashi |
| 2017/0294127 A1 | 10/2017 | Nakatani et al. |
| 2017/0363727 A1* | 12/2017 | Prasad .................. B60W 40/12 |
| 2017/0363728 A1* | 12/2017 | Prasad .................. G01S 13/88 |
| 2018/0090006 A1 | 3/2018 | Ikenouchi et al. |
| 2018/0201192 A1 | 7/2018 | Ishida |
| 2020/0114821 A1* | 4/2020 | Kim ........................ B60Q 1/346 |
| 2020/0126424 A1* | 4/2020 | Raichelgauz ............ G06N 5/04 |

FOREIGN PATENT DOCUMENTS

KR   1020200011672   2/2020

OTHER PUBLICATIONS

"Search Report issued in European Patent Application No. 21166525. 2" dated Aug. 6, 2021, 10 pages.

* cited by examiner

*Primary Examiner* — Sisay Yacob
(74) *Attorney, Agent, or Firm* — NovoTechIP International PLLC (57) ABSTRACT

The present invention provides a rearward warning system that includes a detection unit detecting a location of a target vehicle, an estimation unit estimating a traveling direction of the target vehicle based on the location of the target vehicle detected by the detection unit, and a setting unit setting a collision warning range in respect of a subject vehicle and changing the collision warning range based on the traveling direction of the target vehicle estimated by the estimation unit.

20 Claims, 4 Drawing Sheets

VEHICLE REARWARD WARNING SYSTEM AND ITS METHOD

CROSS-REFERENCE TO RELATED APPLICATION

This application claims priority from Korean Patent Application No. 10-2020-0044327, filed on Apr. 10, 2020, in the Korean Intellectual Property Office, the disclosure of which is incorporated herein by reference in its entirety.

TECHNICAL FIELD

The present invention relates to a vehicle rearward warning system and a control method thereof, and more specifically to a system for detecting a target vehicle on a rear or posterolateral side of a subject vehicle and warning passengers of a collision possibility and a control method thereof.

BACKGROUND

A rearward alert device is a device that alerts a driver when there is a possibility of colliding with an object detected on the posterolateral side of a vehicle in motion.

The rearward alert device may include a blind spot detection (BSD) system which detects, and warns a driver of, an object present in a rear alert area of the vehicle and a lane change assist (LCA) system which determines, and warns the driver of, a collision possibility between the vehicle changing lanes and a target vehicle fast approaching the subject vehicle from behind.

Such vehicle rearward warning system shows the target vehicle moving in and out of a collision warning range as the target vehicle travels away from or toward the subject vehicle.

At this time, a discrepancy between the location of the target vehicle detected by a detection sensor and the location of the rearward collision warning range causes a problem of an error, which calls for a technique for controlling it.

The matters described above as the technical background are intended only for better understanding of the background of the present invention and should not be taken as an acknowledgement that they correspond to the prior art already known to those with common knowledge in the related art.

SUMMARY

The present invention is proposed to solve such a problem and aims to reduce errors in a vehicle rearward collision warning by reducing a collision warning range when a target vehicle leaves the rearward collision warning range as detected by a subject vehicle.

A vehicle rearward warning system according to the present invention includes a detection unit configured to detect a location of a target vehicle, an estimation unit configured to estimate a traveling direction of the target vehicle based on the detected location of the target vehicle, and a setting unit configured to set a collision warning range of the subject vehicle and to adjust the collision warning range based on the estimated traveling direction of the target vehicle.

The detection unit may be connected to a radar sensor positioned at the rear of the subject vehicle and configured to detect the location of the target vehicle positioned behind or on a side of the subject vehicle.

The collision warning range may extend between a first boundary and a second boundary that are spaced apart from each other in a lateral direction with respect to the subject vehicle and the setting unit may be configured to adjust the first or second boundary based on the estimated traveling direction of the target vehicle.

The estimation unit may be further configured to estimate a lateral distance between the target vehicle and the subject vehicle, and the setting unit may be further configured to adjust the second boundary to be closer to the subject vehicle when the estimated lateral distance between the target vehicle and the subject vehicle increases.

The estimation unit may be further configured to estimate a lateral distance between the target vehicle and the subject vehicle, and the setting unit may be configured to adjust the first boundary to be further from the subject vehicle when the estimated lateral distance between the target vehicle and the subject vehicle decreases.

A calculation unit may be configured to calculate the lateral distance between the target vehicle and the subject vehicle based on the detected location of the target vehicle and the setting unit may be further configured to compare the calculated lateral distance between the target vehicle and the subject vehicle with a predetermined distance and to adjust the collision warning range based on the comparison between the calculated lateral distance and the predetermined distance.

The setting unit may be further configured to adjust the first boundary to be closer to the subject vehicle and the second boundary to be further from the subject vehicle when the calculated lateral distance between the target vehicle and the subject vehicle is less than the first boundary or greater than the second boundary.

The setting unit may be further configured to adjust the second boundary to be further from the subject vehicle and the first boundary to be closer to the subject vehicle when the calculated lateral distance between the target vehicle and the subject vehicle is between the first boundary and the second boundary.

The setting unit may be further configured to adjust the second boundary to be closer to the subject vehicle when the estimated traveling direction of the target vehicle indicates that the target vehicle moves away from the subject vehicle and the calculated lateral distance between the target vehicle and the subject vehicle is equal to or greater than a first distance.

The setting unit may be further configured to adjust the first boundary to be further from the subject vehicle when the estimated traveling direction of the target vehicle indicates that the target vehicle moves closers to the subject vehicle and the calculated lateral distance between the target vehicle and the subject vehicle is equal to or less than a second distance.

A vehicle rearward detection method according to an embodiment of the present invention includes detecting the location of the target vehicle, estimating the traveling direction of the target vehicle based on the detected location of the target vehicle, and setting the collision warning range of the subject vehicle and adjusting the collision warning range based on the estimated traveling direction of the target vehicle.

The detecting the location of the target vehicle may comprise detecting, using a radar sensor positioned at a rear portion of the subject vehicle, that location of the target vehicle positioned behind or on a side of the subject vehicle.

The collision warning range may extend between the first boundary and the second boundary that are spaced apart from each other in the lateral direction with respect to the subject vehicle, and the setting the collision warning range may comprise adjusting the first boundary or the second boundary based on the detected traveling direction.

The setting the collision warning range may comprise adjusting the second boundary to be closer to the subject vehicle when the lateral distance between the target vehicle and the subject vehicle increases.

The first boundary may be adjusted to be further from the subject vehicle in the setting step when the lateral distance between the target vehicle and the subject vehicle decreases.

Calculating the lateral distance between the subject vehicle and the target vehicle based on the detected location of the target vehicle, comparing the calculated lateral distance between the subject vehicle and the target vehicle with a predetermined distance, and adjusting the collision warning range based on the comparison between the calculated lateral distance and the predetermined distance may be further included.

The setting the collision warning range may comprise adjusting the first boundary to be closer to the subject vehicle and the second boundary to be further from the subject vehicle when the calculated lateral distance between the target vehicle and the subject vehicle is less than the first boundary or greater than the secondary boundary.

The adjusting the collision warning range may comprise adjusting the second boundary to be further from the subject vehicle and the first boundary to be closer to the subject vehicle when the calculated lateral distance between the target vehicle and the subject vehicle is between the first boundary and the second boundary.

The adjusting the collision warning range may comprise adjusting the second boundary to be closer to the subject vehicle when the estimated traveling direction of the target vehicle indicates that the target vehicle moves away from the subject vehicle and the calculated lateral distance between the target vehicle and the subject vehicle is equal to or greater than the predetermined first distance.

The adjusting the collision warning range may comprise adjusting the first boundary to be further from the subject vehicle when the estimated traveling direction of the target vehicle indicates that the target vehicle moves closer to the subject vehicle and the calculated lateral distance between the target vehicle and the subject vehicle is equal to or less than the predetermined second distance.

A vehicle rearward warning system according to the present invention has an effect of reducing the collision warning range when the target vehicle leaves the collision warning range, thereby improving the accuracy in detecting a target vehicle deviating from a collision warning range.

DETAILED DESCRIPTION OF THE INVENTION

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiments according to the present invention may be modified in various ways and have various forms, specific embodiments will be illustrated in the drawings and described in detail in the present specification or application. However, this is not intended to limit the embodiments according to the concept of the present invention to a specific disclosure form and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the present specification are only used to describe specific embodiments and are not intended to limit the present invention. Singular expressions include plural expressions unless the context clearly indicates otherwise. In the present specification, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Unless otherwise defined, all terms used herein, including technical or scientific terms, have the same meanings as are generally understood by those with common knowledge in the art to which the present invention belongs. The terms such as those defined in a generally used dictionary should be interpreted as having meanings consistent with the meanings in the context of the related technology and should not be interpreted as an idealistic or excessively formal meaning unless explicitly defined in the present specification.

Hereinafter, the present invention will be described in detail by describing preferred embodiments of the present invention with reference to the accompanying drawings. The same reference numerals shown in each drawing indicate the same members.

An algorithm configured to control the operations of various components of a vehicle or a nonvolatile memory (not shown) configured to store data relating to software commands for reproducing the algorithm and the data stored in the memory may be used to implement a control unit according to an exemplary embodiment of the present invention through a processor (not shown) configured to performs the operations to be described below. Here, the memory and the processor may be implemented as individual chips. Alternatively, the memory and processor may be implemented as a single chip integrated with each other. The processor may take the form of one or more processors.

Figure 1:
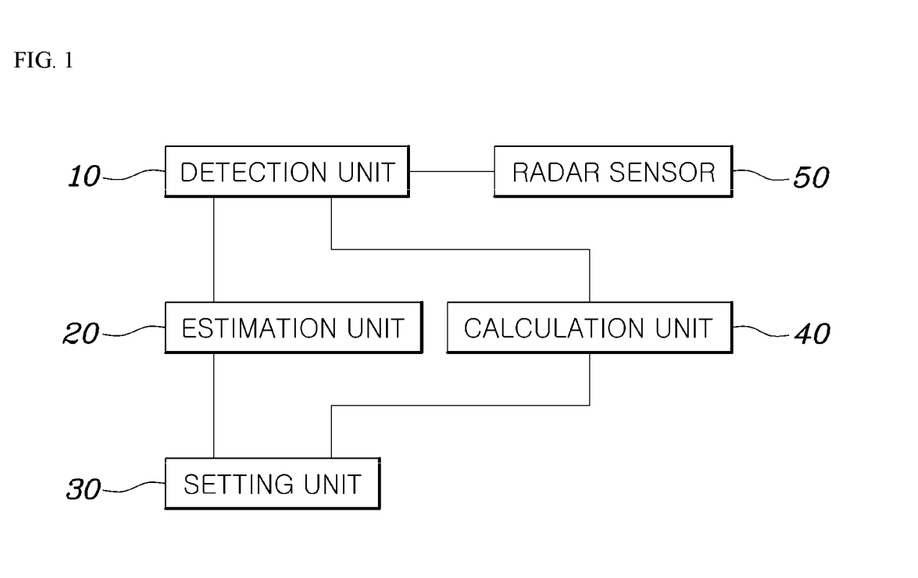
FIG. 1 is a view showing a configuration of a vehicle rearward warning system according to an embodiment of the present invention.
Figure 2:
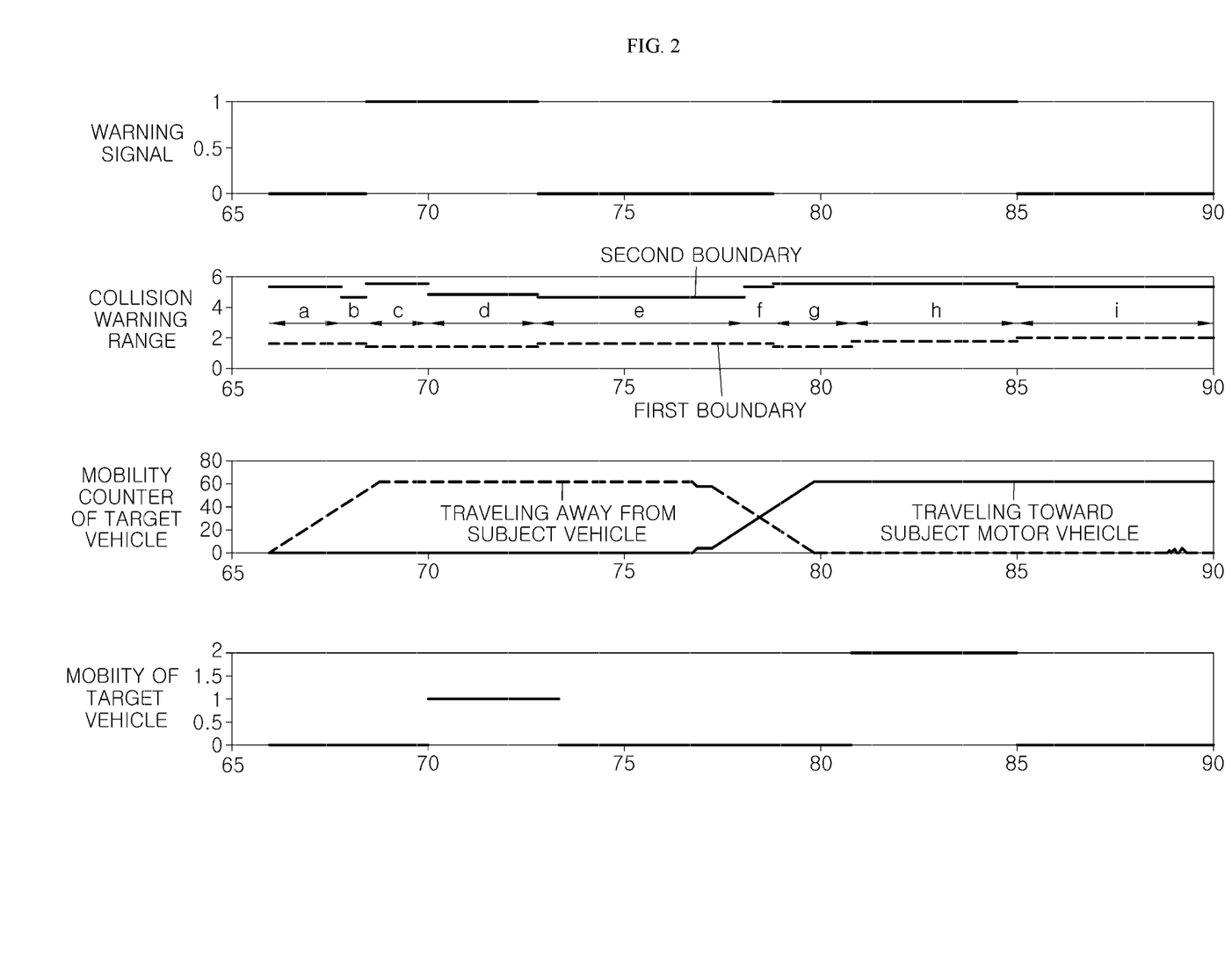
FIG. 2 is a view showing an example of a vehicle rearward warning system according to an embodiment of the present invention.
Figure 3:
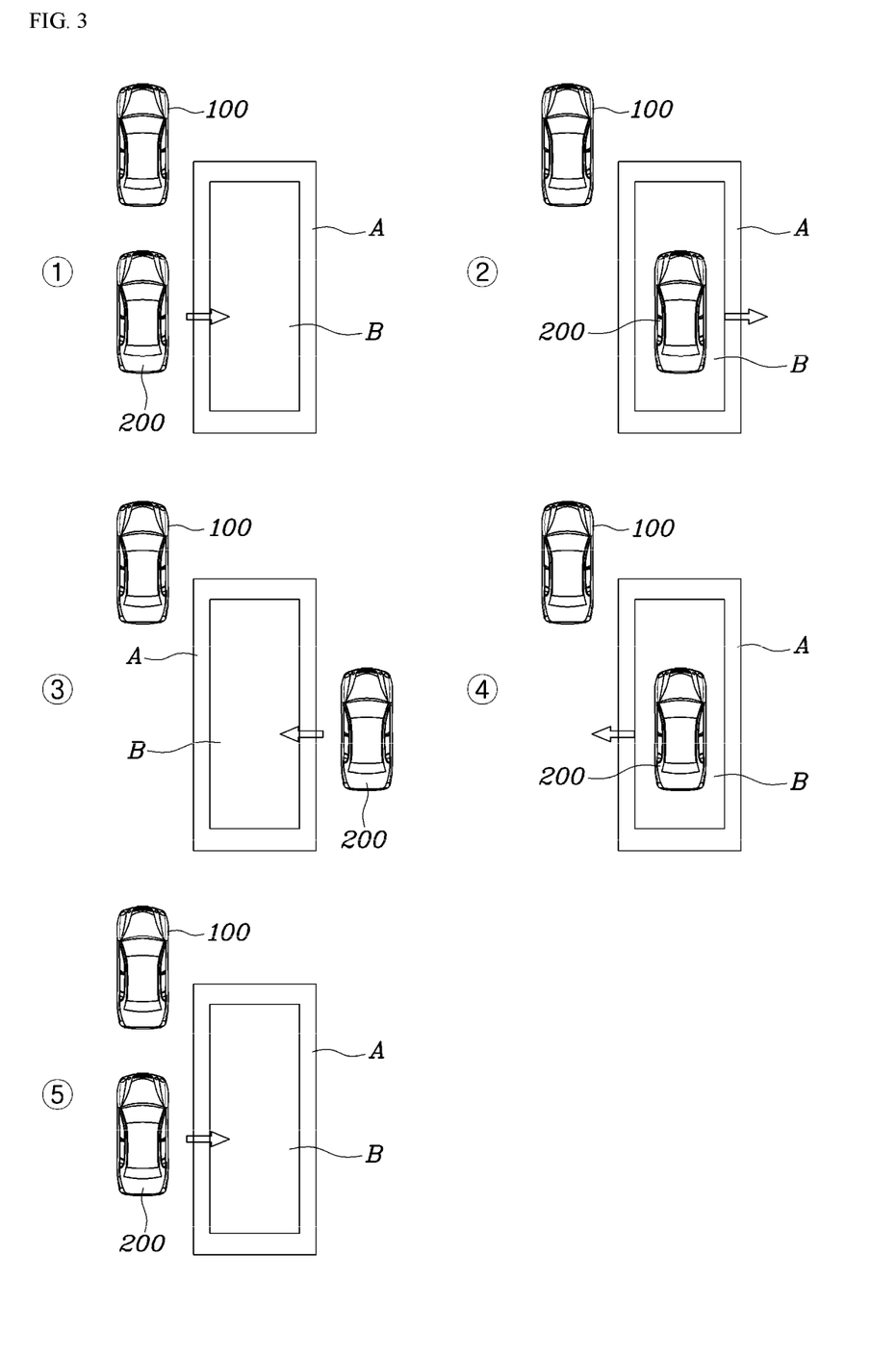
FIG. 3 is a view showing locations of a first boundary and a second boundary in accordance with a location of a target vehicle in a vehicle rearward warning system according to an embodiment of the present invention.

FIG. 1 is a view showing a configuration of a vehicle rearward warning system according to an embodiment of the present invention, FIG. 2 is a view showing an example of the vehicle rearward warning system according to an embodiment of the present invention, and FIG. 3 is a view showing locations of a first boundary and a second boundary in accordance with a location of a target vehicle 200 in the vehicle rearward warning system according to an example of the present invention.

Hereinafter, a vehicle rearward warning system according to a preferred embodiment of the present invention will be described with reference to the accompanying FIGS. 1 to 3.

The vehicle rearward warning system according to the present invention may detect the target vehicle 200 approaching a subject vehicle 100 from a posterolateral side and issue an alert signal to passengers of the vehicle, thereby reducing accidents of a rear-end collision or a sideswipe collision.

A plurality of detection means capable of detecting the target vehicle 200 are mounted in the rear of the vehicle so as to be able to detect the target vehicle 200 traveling in the lateral direction behind the vehicle.

The vehicle rearward warning system according to the present invention may set a collision detection range for detecting the target vehicle 200 traveling in the lateral direction behind the vehicle at a speed higher than a predetermined speed. The collision detection range may be reduced before the target vehicle 200 enters the collision detection range to form a warning generation range A where a collision warning is generated when the target vehicle 200 completely enters the collision detection range. Accordingly, a warning is not generated against a small movement of the target vehicle 200 in the lateral direction behind the subject vehicle 100 and detection is rendered possible only when a complete entry into the warning generation range A is made, so that a false detection is prevented.

The collision detection range may be expanded into a warning maintenance range B when the target vehicle 200 completely enters the warning generation range A and maintains a distance to the subject vehicle 100. Accordingly, the warning is canceled when the target vehicle 200 on the posterolateral side completely gets out of the warning maintenance range B and the warning signal is not canceled against even a small movement of the target vehicle 200 detected as the warning maintenance range B is expanded, so that the target vehicle 200 on the posterolateral side of the subject vehicle 100 may be accurately detected.

The graph 1 of FIG. 2 shows the warning signal of the vehicle rearward warning system according to the present invention, 1 indicating that the signal is on and 0 indicating that the signal is off. The graph 2 shows changes in the collision warning range. The graph 3 shows a counter for determining mobility of the target vehicle 200 and illustrates movements for 60 seconds during which 1 is added at the time of traveling toward the subject vehicle 100 or away from the subject vehicle 100. The graph 4 shows a traveling direction of the target vehicle 200 after a collision warning.

Specifically, the vehicle rearward warning system according to the present invention includes a detection unit 10 that detects the location of the target vehicle, an estimation unit 20 that estimates traveling direction of the target vehicle 200 based on the location of the target vehicle 200 detected by the detection unit 10, and a setting unit 30 that sets the collision warning range in respect of the subject vehicle 100 and changes the collision warning range based on the travel direction of the target vehicle 200 estimated by the estimation unit 20.

Further referring to FIGS. 1 and 2, the detection unit 10 may detect the target vehicle 200 traveling in the lateral direction while changing lanes behind the vehicle and form the collision detection range to detect the target vehicle 200 entering the collision detection range.

The estimation unit 20 may detect the mobility of the target vehicle 200 traveling in the lateral direction behind the subject vehicle 100 and estimate the traveling direction of the target vehicle 200. When the target vehicle 200 travels in the lateral direction behind the subject vehicle 100, of the numerical values in the graph 4 of FIG. 2, 1 indicates the target vehicle 200 traveling away from the subject vehicle 100 and 2 indicates the target vehicle 200 traveling toward the subject vehicle 100.

The setting unit 30 may change the collision warning range as shown in the graph 2 of FIG. 2. The setting unit 30 may change the collision warning range based on the traveling direction of the target vehicle 200 estimated by the estimation unit 20. Accordingly, the collision warning range is reduced when the target vehicle leaves the collision warning range so that the passengers is informed of the accurate location of the target vehicle 200.

The detection unit 10 is connected to a radar sensor 50 mounted in the rear of the vehicle and detects the location of the target vehicle 200 located behind or on the side of the vehicle.

The detection unit 10 may detection the target vehicle 200 traveling in the lateral direction behind the vehicle by the radar sensor 50 mounted in the rear of the vehicle and may be connected to a means other than the radar sensor 500 such as an ultrasonic sensor capable of detecting the target vehicle 200.

The setting unit 30 sets the collision warning range between the first boundary and the second boundary that is spaced from the first boundary in the lateral direction of the subject vehicle 100 and changes the first boundary or the second boundary based on the traveling direction of the target vehicle 200 estimated by the estimation unit 20.

The first boundary and the second boundary may be moved by the application of the formula as shown in the table below.

| | | traveling of target vehicle | formula | actual values (m) |
|---|---|---|---|---|
| first boundary | warning range A generation | ordinary traveling | A | 1.64 |
| | | traveling to left | $A + \Delta\gamma$ | 1.98 [1.64 + (0.34)] |
| | warning range B maintenance | traveling in a range | $A - \Delta\alpha$ | 1.44 [1.64 − (0.2)] |
| | | traveling to left | $A - \Delta\alpha + \Delta\gamma$ | 1.78 [1.64 − (0.2) + (0.34)] |

|  |  | traveling of target vehicle | formula | actual values (m) |
|---|---|---|---|---|
| second boundary | warning range A generation | ordinary traveling | B | 5.36 |
|  |  | traveling to right | B − Δσ | 4.66 [5.36 − (0.7)] |
|  | warning range B maintenance | ordinary traveling | B + Δβ | 5.56 [5.36 + (0.2)] |
|  |  | traveling to right | B + Δβ − Δσ | 4.86 [5.36 + (0.2) − (0.7)] |

The collision warning range may be formed with the first boundary and the second boundary spaced from each other so that the passengers may be advised when the target vehicle 200 advances between the first boundary and the second boundary, and the first boundary or the second boundary may be moved based on the traveling direction of the target vehicle 200 so that the erroneous discrepancy between the actual location of the target vehicle 200 and the location detected by the sensor may be reduced.

The above table shows a situation where the target vehicle does not enter the warning generation range A, and the formula A is applied to the first boundary while formula B is applied to the second boundary.

The first boundary may be formed 1.64 m away from the subject vehicle 100 and the second boundary may be formed 5.36 m away from the subject vehicle 100 in a of FIG. 2. The numerical values of the first boundary and the second boundary are arbitrary values and may be changed.

A calculation unit 40 that calculates the lateral distance between the target vehicle 200 and the subject vehicle 100 based on the location of the target vehicle 200 detected by the detection unit 10 is further included, and the setting unit 30 compares the lateral distance between the subject vehicle 100 and the target vehicle 200 with a predetermined distance and changes the collision warning range based on the comparison result.

Further referring to FIG. 2, the graph 3 of FIG. 2 shows a signal of the calculation unit 40 that calculates the position of the target vehicle. The calculation unit 40 may calculate the location of the target vehicle 200 traveling in the lateral direction behind the subject vehicle 100 in real time and input the increases and decreases of the location into the setting unit 30.

Accordingly, the collision warning range is changed from the warning generation range A into the warning maintenance range B when the target vehicle 200 enters the collision warning range, so that there is an effect of accurately recognizing the target vehicle 200 without recognizing vehicles other than the target vehicle 200.

The setting unit 30 moves the second boundary toward the subject vehicle 100 when it is estimated by the estimation unit 20 that the lateral distance between the target vehicle 200 and the subject vehicle 100 increases.

Further referring to FIGS. 2 and 3, the setting unit 30 may change the collision warning range in a situation where the target vehicle 200 is traveling in the lateral direction behind the subject vehicle 100.

Formula B−Δσ may be applied to the second boundary in the above table.

The setting unit 30 moves the second boundary toward subject vehicle 100 to quickly cancel the warning signal when it is estimated that the lateral distance from the subject vehicle 100 increases such that the target vehicle 200 leaves the collision warning range after the warning signal.

Accordingly, there is an effect of reducing an erroneous discrepancy between the actual location of the target vehicle 200 when the target vehicle 200 travels and the collision warning range.

The setting unit 30 moves the first boundary away from the subject vehicle 100 when the estimation unit 20 estimates that the lateral distance between the target vehicle 200 and the subject vehicle 100 decreases.

Further referring to FIGS. 2 and 3, the setting unit 30 may change the collision warning range in a situation where the target vehicle 200 travels in the lateral direction behind the subject vehicle 100 to get close to the subject vehicle 100.

Formula A+Δγ may be applied to the first boundary in the above table.

The estimation unit 20 moves the first boundary away from the subject vehicle 100 to quickly cancel the warning signal when it is estimated that the lateral distance from the subject vehicle 100 decreases and that the target vehicle 200 left the collision warning range after the collision warning.

Accordingly, there is an effect of reducing an erroneous discrepancy between the actual location of the target vehicle 200 when the target vehicle 200 travels and the collision warning range.

A calculation unit 40 that calculates the lateral distance between the target vehicle 200 and the subject vehicle 100 based on the location of the target vehicle 200 detected by the detection unit 10 is further included, and the setting unit 30 compares the lateral distance between the subject vehicle 100 and the target vehicle 200 estimated by the estimation unit 40 with a predetermined distance and changes the collision warning range based on the comparison result.

The calculation unit 40 calculates the location of the target vehicle 200 traveling in the lateral direction behind the subject vehicle 100 in real time and input it into the setting unit 30.

Accordingly, the collision warning range is changed from the warning generation range A into the warning maintenance range B when the target vehicle 200 enters the collision warning rate, so that there is an effect of accurately recognizing the target vehicle 200 without recognizing vehicles other than the target vehicle 200.

The setting unit 30 moves the first boundary toward the subject vehicle 100 and the second boundary away from the subject vehicle 100 when the calculation unit 40 calculates that the lateral distance between the target vehicle 200 and the subject vehicle 100 is less than the first boundary or greater than the second boundary.

When the calculation unit 40 calculates that the location of the target vehicle 200 is less than the first boundary which is close to the vehicle or greater than the second boundary which is spaced from the first boundary away from the vehicle and determines that the target vehicle 200 is out of the collision warning range, the setting unit 30 may move the first boundary toward the subject vehicle 100 to reduce the warning maintenance range B and move the second boundary away from the subject vehicle 100 to form the warning generation range A again.

This generates the effect of reliably canceling the collision warning against the target vehicle 200 traveling to the locations adjacent to the first boundary and the second boundary before being moved.

The setting unit 30 moves the second boundary away from the subject vehicle 100 and the first boundary toward the subject vehicle 100 when the calculation unit 40 calculates that the lateral distance between the target vehicle 200 and the subject vehicle 100 is between the first boundary and the second boundary.

Further referring to the FIGS. 2 and 3, the setting unit 30 may change the collision warning range in a situation where the distance between the target vehicle 200 and the subject vehicle 100 increases to be between the first boundary and the second boundary on the posterolateral side of the subject vehicle 100.

Formula A−Δα may be applied to the first boundary while formula B+Δβ may be applied to the second boundary in the above table.

Now the situations in c and g of FIG. 2 and ② of FIG. 3 will be described. When the calculation unit 40 calculates that the lateral distance between the target vehicle 200 and the subject vehicle 100 is between the first boundary and the second boundary, the setting unit 30 moves the first boundary to 1.44 m and the second boundary to 5.56 m to form the warning maintenance range B. The boundary range numerical values may be changed.

Accordingly, the collision warning is not canceled against a small movement of the target vehicle 200, so that there is an effect of getting prepared for an accident of a rear-end collision.

The setting unit 30 moves the second boundary toward the subject vehicle 100 when the estimation unit 20 estimates that the target vehicle 200 travels away from the subject vehicle 100 and the calculation unit 40 calculates that the distance between the target vehicle 200 and the subject vehicle 100 is equal to or greater than a predetermined first distance.

Further referring to FIGS. 2 and 3, the setting unit 30 may change the collision warning range in a situation where the distance between the target vehicle 200 and the subject vehicle 100 increases from the predetermined first distance to a predetermined second distance on the posterolateral side of the subject vehicle 100.

Formula B+Δβ−Δσ may be applied to the second boundary in the above table.

Now the situation in d of FIG. 2 and switching from ② to ③ of FIG. 3 will be described. The setting unit 30 moves the second boundary to 4.86 m when the calculation unit 40 calculates that the distance between the target vehicle 200 and the subject vehicle 100 is equal to or greater than the predetermined first distance and the estimation unit 20 estimates that the target vehicle 200 travels away from the subject vehicle 100 in the collision warning range. The boundary range numerical values of FIG. 2 may be changed. The first distance may be the distance to the adjacent lane spaced from the subject vehicle 100.

Accordingly, the collision warning range is reduced as the second boundary is moved toward the subject vehicle 100 and the collision warning against the target vehicle 200 traveling away from the subject vehicle 100 is canceled more quickly, so that there is an effect of further improving the accuracy of the vehicle rearward warning system.

The setting unit 30 moves the first boundary away from the subject vehicle 100 when the estimation unit 20 estimates that the target vehicle 200 travels toward the subject vehicle 100 and the calculation unit 40 calculates that the distance between the target vehicle 200 and the subject vehicle 100 is equal to or less than the predetermined second distance.

Further referring to FIGS. 2 and 3, the setting unit 30 may change the collision warning range in a situation where the distance between the target vehicle 200 and the subject vehicle 100 is decreasing on the posterolateral side of the subject vehicle 100. This is a situation where the target vehicle 200 is leaving the collision warning range away from the subject vehicle 100 rearward.

Formula A−Δα+Δγ may be applied to the first boundary in the above table.

Now the situation of h in FIG. 2 and switching from ④ to ⑤ in FIG. 3 will be described. The setting unit 30 moves the first boundary to 1.78 m when the calculation unit 40 calculates that the distance between the target vehicle 200 and the subject vehicle 100 is equal to or less than the predetermined second distance and the estimation unit 20 estimates that the target vehicle 200 travels toward the subject vehicle 100. In a situation where the target vehicle 200 travels toward the subject vehicle 100 and leaves the collision warning range, the first boundary is moved away from the subject vehicle 100 and the collision warning is canceled the moment the target vehicle 200 leaves the collision warning range.

The second distance may be the distance to the lanes, spaced from the subject vehicle 100, on both sides of the subject vehicle 100.

Accordingly, the target vehicle 200 is accurately detected when it travels rearward away from the collision warning range to the rear of the subject vehicle 100, so that the collision warning may be cancelled and there is an effect of alleviating the fatigue the passengers feel from the frequent alarms.

Figure 4:
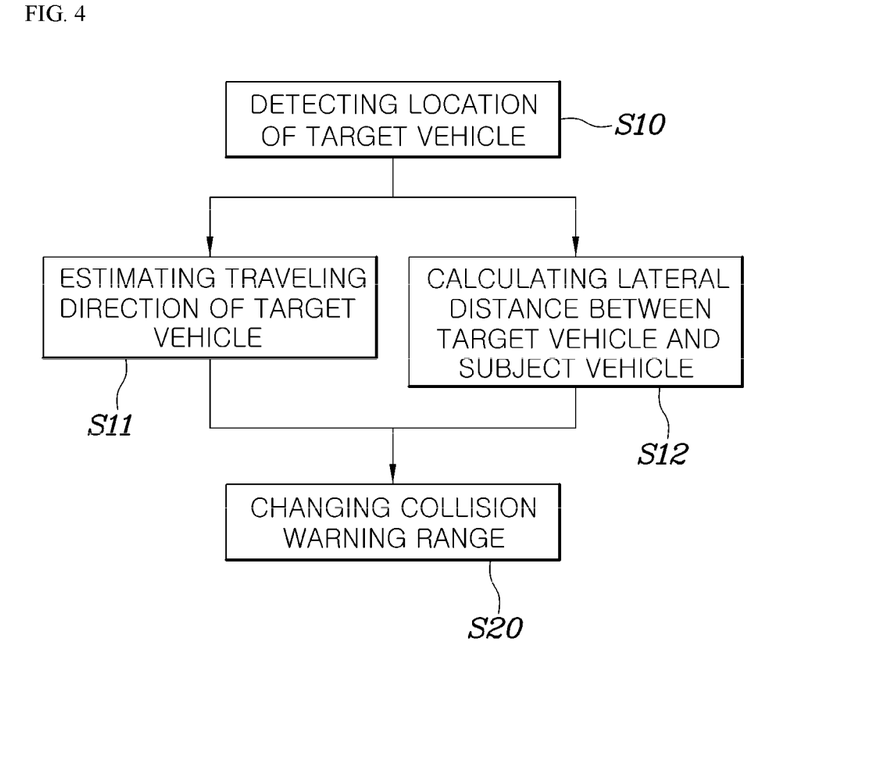
FIG. 4 is a flowchart showing a vehicle rearward warning method according to an embodiment of the present invention.

FIG. 4 is a flowchart showing the vehicle rearward warning method according to an embodiment of the present invention.

Referring to FIG. 4, the vehicle rearward detection method according to the embodiment of the present invention includes a detection step S10 of detecting the location of the target vehicle, an estimation step S11 of estimating the traveling direction of the target vehicle 200 based on the location of the target vehicle 200 detected in the detection step S10, and a setting step S20 of setting the collision warning range in respect of the subject vehicle 100 and changing the collision warning range based on the traveling direction of the target vehicle 200 estimated in the estimating step S11.

In the detection step S10, the location of the target vehicle 200 located behind or on the side of the vehicle is detected in connection with the radar sensor 50 mounted in the rear of the vehicle.

In the setting step S20, the collision warning range is set between the first boundary and the second boundary spaced from each other in the lateral direction of the subject vehicle 100 and the first boundary and the second boundary are moved based on the travel direction of the target vehicle 200 estimated in the estimation step S11.

The second boundary is moved toward the subject vehicle 100 in the setting step S20 when it is estimated in the estimation step S11 that the lateral distance between the target vehicle 200 and the subject vehicle 100 increases.

The first boundary is moved away from the subject vehicle 100 in the setting step S20 when it is estimated in the estimation step S11 that the lateral distance between the target vehicle 200 and the subject vehicle 100 decreases.

A calculation step S12 of calculating the lateral distance between the subject vehicle 100 and the target vehicle 200 based on the location of the target vehicle 200 detected in the detection step S10 is further included, and the lateral distance between the subject vehicle 100 and the target vehicle 200 calculated in the calculation step S12 is compared with the predetermined distance and the collision warning range is changed based on the comparison result in the setting step S20.

The first boundary is moved toward the subject vehicle 100 and the second boundary is moved away from the subject vehicle 100 in the setting step S20 when it is estimated in the estimation step S12 that the lateral distance between the target vehicle 200 and the subject vehicle 100 is less than the first boundary or greater than the second boundary.

The second boundary is moved away from the subject vehicle 100 and the first boundary is moved toward the subject vehicle 100 in the setting step S20 when it is estimated in the estimation step S12 that the lateral distance between the target vehicle 200 and the subject vehicle 100 is between the first boundary and the second boundary.

The second boundary is moved toward the subject vehicle 100 in the setting step S20 when it is estimated in the estimation step S11 that the target vehicle 200 travels away from the subject vehicle 100 and it is calculated in the calculation step S12 that the distance between target vehicle 200 and the subject vehicle 100 is equal to or greater than the predetermined first distance.

The first boundary is moved away from the subject vehicle 100 in the setting step S20 when it is estimated in the estimation step S11 that the target vehicle 200 travels toward the subject vehicle 100 and it is calculated in the calculation step S12 that the distance between the target vehicle 200 and the subject vehicle 100 is equal to or less than the predetermined second distance.

Specific embodiments of the present invention are illustrated and described, but it will be self-evident to those with common knowledge in the related art that the present invention may be improved and modified in various ways within the scope of the technical spirit of the present invention provided by the patent claims below.

What is claimed is:

1. A method for providing a vehicle rearward warning, comprising:
    detecting a location of a target vehicle with respect to a subject vehicle;
    estimating a traveling direction of the target vehicle based on the detected location of the target vehicle;
    setting a collision warning range of the subject vehicle; and
    adjusting a size of the collision warning range based on the estimated traveling direction of the target vehicle.

2. The method of claim 1, wherein detecting the location of the target vehicle comprises detecting, using a radar sensor positioned at a rear portion of the subject vehicle, that location of the target vehicle positioned behind or on a side of the subject vehicle.

3. The method of claim 1, wherein:
    the collision warning range laterally extends between first and second boundaries laterally spaced apart from each other and from the subject vehicle,
    the first boundary has a first lateral distance from the subject vehicle, and the second boundary has a second lateral distance from the subject vehicle greater than the first lateral distance, and
    setting the collision warning range comprises adjusting, based on the estimated travel direction of the target vehicle, at least one of the first and second lateral distances of the first and second boundaries.

4. The method of claim 3, wherein adjusting the size of the collision warning range comprises reducing the second lateral distance of the second boundary when a lateral distance between the target vehicle and the subject vehicle increases.

5. The method of claim 3, wherein adjusting the size of the collision warning range comprises increasing the first lateral distance of the first boundary when a lateral distance between the target vehicle and the subject vehicle decreases.

6. The method of claim 3, further comprising:
    calculating a lateral distance between the subject vehicle and the target vehicle based on the detected location of the target vehicle; and
    comparing the calculated lateral distance between the subject vehicle and the target vehicle with a predetermined distance.

7. The method of claim 6, wherein adjusting the size of the collision warning range comprises reducing the first lateral distance of the first boundary and increase the second lateral distance of the second boundary when the calculated lateral distance between the target vehicle and the subject vehicle is less than the first lateral distance of the first boundary or greater than the second lateral distance of the second boundary.

8. The method of claim 6, wherein adjusting the size of the collision warning range comprises increasing the second lateral distance of the second boundary and reducing the first lateral distance of the first boundary when the calculated lateral distance between the target vehicle and the subject vehicle is between the first lateral distance of the first boundary and the second lateral distance of the second boundary.

9. The method of claim 6, wherein adjusting the size of the collision warning range comprises reducing the second lateral distance of the second boundary when the estimated traveling direction of the target vehicle indicates that the target vehicle moves away from the subject vehicle and the calculated lateral distance between the target vehicle and the subject vehicle is equal to or greater than a predetermined distance.

10. The method of claim 6, wherein adjusting the size of the collision warning range comprises increasing the first lateral distance of the first boundary when the estimated traveling direction of the target vehicle indicates that the target vehicle moves closer to the subject vehicle and the calculated lateral distance between the target vehicle and subject vehicle is equal to or less than a predetermined distance.

11. A vehicle rearward warning system comprising:
    a detection unit configured to detect a location of a target vehicle with respect to a subject vehicle;
    an estimation unit configured to estimate a traveling direction of the target vehicle based on the detected location of the target vehicle; and
    a setting unit configured to:
        set a collision warning range of the subject vehicle; and
        adjust a size of the collision warning range based on the estimated traveling direction of the target vehicle.

12. The vehicle rearward warning system of claim 11, wherein the detection unit is connected to a radar sensor positioned at a rear portion of the subject vehicle and configured to detect the location of the target vehicle positioned behind or on a side of the subject vehicle.

13. The vehicle rearward warning system of claim 11, wherein:
    the collision warning range laterally extends between first and second boundaries laterally spaced apart from each other and from the subject vehicle, the first boundary has a first lateral distance from the subject vehicle, and the second boundary has a second lateral distance from the subject vehicle greater than the first lateral distance, and the setting unit is configured to adjust, based on the estimated traveling direction of the target vehicle, at least one of the first and second lateral distances of the first and second boundaries.

14. The vehicle rearward warning system of claim 13, wherein:

the estimation unit is further configured to estimate a lateral distance between the target vehicle and the subject vehicle, and the setting unit is further configured to reduce the second lateral distance of the second boundary when the estimated lateral distance between the target vehicle and the subject vehicle increases.

15. The vehicle rearward warning system of claim 13, wherein:

the estimation unit is further configured to estimate a lateral distance between the target vehicle and the subject vehicle, and the setting unit is further configured to increase the first lateral distance of the first boundary when the estimated lateral distance between the target vehicle and the subject vehicle decreases.

16. The vehicle rearward warning system of claim 13, further comprising a calculation unit configured to calculate a lateral distance between the subject vehicle and the target vehicle based on the detected location of the target vehicle, wherein the setting unit is further configured to compare the calculated lateral distance between the subject vehicle and the target vehicle with a predetermined distance, and to adjust the size of the collision warning range based on the comparison between the calculated lateral distance and the predetermined distance.

17. The vehicle rearward warning system of claim 16, wherein the setting unit is further configured to reduce the first lateral distance of the first boundary and increase the second lateral distance of the second boundary when the calculated lateral distance between the target vehicle and the subject vehicle is less than the first lateral distance of the first boundary or greater than the second lateral distance of the second boundary.

18. The vehicle rearward warning system of claim 16, wherein the setting unit is further configured to increase the second lateral distance of the second boundary and reduce the first lateral distance of the first boundary when the calculated lateral distance between the target vehicle and the subject vehicle is between the first lateral distance of the first boundary and the second lateral distance of the second boundary.

19. The vehicle rearward warning system of claim 16, wherein the setting unit is further configured to reduce the second lateral distance of the second boundary when the estimated traveling direction of the target vehicle indicates that the target vehicle moves away from the subject vehicle and the calculated lateral distance between the target vehicle and the subject vehicle is equal to or greater than a predetermined distance.

20. The vehicle rearward warning system of claim 14, wherein the setting unit is further configured to increase the first lateral distance of the first boundary when the estimated traveling direction of the target vehicle indicates that the target vehicle moves closers to the subject vehicle and the calculated lateral distance between the target vehicle and the subject vehicle is equal to or less than a predetermined distance.

\* \* \* \* \*